US010296382B2

(12) United States Patent
Alrashed et al.

(10) Patent No.: US 10,296,382 B2
(45) Date of Patent: May 21, 2019

(54) METHOD FOR DETERMINING EARLIEST DEADLINE FIRST SCHEDULABILITY OF NON-PREEMPTIVE UNI-PROCESSOR SYSTEM

(71) Applicant: Imam Abdulrahman Bin Faisal University, Dammam (SA)

(72) Inventors: Saleh Alrashed, Dammam (SA); Jamal Alhiyafi, Dammam (SA); Aamir Shafi, Dammam (SA); Nasro Min Allah, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 204 days.

(21) Appl. No.: 15/598,055

(22) Filed: May 17, 2017

(65) Prior Publication Data

US 2018/0336064 A1 Nov. 22, 2018

(51) Int. Cl.
*G06F 9/46* (2006.01)
*G06F 9/48* (2006.01)

(52) U.S. Cl.
CPC .......... *G06F 9/4887* (2013.01); *G06F 9/4831* (2013.01)

(58) Field of Classification Search
CPC .. G06F 9/4887; G06F 9/4881; G06F 11/0757; G06F 11/3024; G06F 2209/5021; G06F 9/4831; G06F 9/5027; G06F 9/528
See application file for complete search history.

(56) References Cited

U.S. PATENT DOCUMENTS 9,632,845 B2 * 4/2017 Pai .......................... G06F 9/54
2004/0117577 A1 6/2004 Bloks
(Continued)

OTHER PUBLICATIONS

Matthew C. Gombolay and Julie A. Shah;Uniprocessor Scheduling Policy for Non-Preemptive Task Sets with Precedence and Temporal Constraints; 2012; https://interactive.mit.edu/sites/default/files/documents/infotechPaperGombolayShah.pdf; (Year: 2012).*

(Continued)

*Primary Examiner* — Dong U Kim
(74) *Attorney, Agent, or Firm* — Oblon, McClelland, Maier & Neustadt, L.L.P.

(57) ABSTRACT

Earliest deadline first (EDF) scheduling algorithm is the most celebrated result for dynamic priority scheduling in real-time systems for both preemptive and non-preemptive cases. From complexity point of view, EDF is polynomial for preemptive scheduling of tasks. However, it becomes pseudo-polynomial under non-preemptive case. Described herein is a technique that determines EDF feasibility of non-preemptive task set by analyzing schedulability of the lowest priority task at common scheduling points generated by all higher priority tasks in the task set. The adjustment results in improving the computational cost of an existing test from $O(n_2 \, p_n/p_1)$ to $O(p_n/p_1)$, where n is the number of tasks in the system, while pn and p1 represent the task periods of largest and smallest periodic tasks respectively. With reduced computation cost, the described method of analyzing feasibility can be intergraded with online systems for testing feasibility of a special class of real-time systems under non-preemptive case.

18 Claims, 4 Drawing Sheets

(56) References Cited

U.S. PATENT DOCUMENTS

| | | | |
|---|---|---|---|
| 2007/0033143 A1* | 2/2007 | Saito | G06Q 10/10 705/51 |
| 2007/0136729 A1* | 6/2007 | Neuman | G06F 9/4887 718/102 |
| 2013/0290970 A1* | 10/2013 | Shah | G06F 9/4887 718/102 |
| 2017/0031699 A1* | 2/2017 | Banerjee | G06F 9/45558 |

OTHER PUBLICATIONS

Muhammad Bilal Qureshi et al. "Maintaining the Feasability of Hard Real-Time Systems With a Reduced Number of Priority Leve's," International Journal of Applied Mathematics and Computer Science, 2015, vol. 25, No. 4, pp. 709-722.

C.L. Liu et al., "Scheduling Algorithms for Multiprogramming in a Hard-Real-Time Environment," Association for Computing Machinery, 1973, pp. 1-15.

Sangwon Kim et al., "Runtime Feasability Check for Non-Preemptive Real-Time Periodic Tasks," Information Processing Letters, Nov. 2005, vol. 97, pp. 83-87.

* cited by examiner

METHOD FOR DETERMINING EARLIEST DEADLINE FIRST SCHEDULABILITY OF NON-PREEMPTIVE UNI-PROCESSOR SYSTEM

FIELD OF DISCLOSURE

The present disclosure is directed to a method of determining feasibility of a set of non-preemptive tasks on a uni-processor system. Specifically, the present disclosure relates to a method of reducing the computational complexity in computing feasibility of a schedule for non-preemptive tasks in real-time systems.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In a real-time task scheduling systems, a typical goal is to schedule the system's tasks on a processor, or processors, so that each task completes execution before a specified deadline. The concept of a task that is invoked repeatedly is central to both the design and analysis of real-time systems. In particular, formal studies of real-time systems frequently represent the time-constrained processing requirements of the system as a set of periodic or sporadic tasks with deadlines.

An important class of scheduling algorithms is the class of dynamic priority algorithms. In such systems, the priority of a task can change during its execution and in the most important dynamic priority algorithms, the priority of a job (instance of a task) is inversely proportional to its absolute deadline. Non-preemptive scheduling has become a mature technique and is being implemented atop of many commercial operating systems. However, the computation cost associated with respective feasibility condition is very high. Things become more complex for the non-preemptive version of the system as compared to the corresponding preemptive version. As compared to preemptive scheduling, non-preemptive systems have received very little attention from the research community and many efforts are taking place currently to contribute towards establishing new results for the non-preemptive counterpart.

Specifically, all the existing feasibility analysis techniques exhibit high computational complexity and are thus impractical for online systems. For instance, these problems are NP-Hard in the strong sense and as a consequence, a decent share of the processor time is devoted to determine feasibility of the set of tasks, instead of the actual execution of tasks. For example, referring to the work of Chakraborty et al. in "Schedulability analysis of non-preemptive recurring real-time tasks", in parallel and distributed processing symposium, and incorporated herein by reference in its entirety, it is shown that there exist polynomial time approximation algorithms for both preemptive and non-preemptive scheduling of recurring task model. However, the focus of the above work was to reduce the power consumption of the system. Accordingly, with respect to the feasibility determination problem, the work of Chakraborty et al. is still um-deterministic (i.e., NP Hard).

Accordingly, there is a requirement for a method to determine, in a polynomial amount of time, the feasibility of scheduling a particular task set on a uni-processor system.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
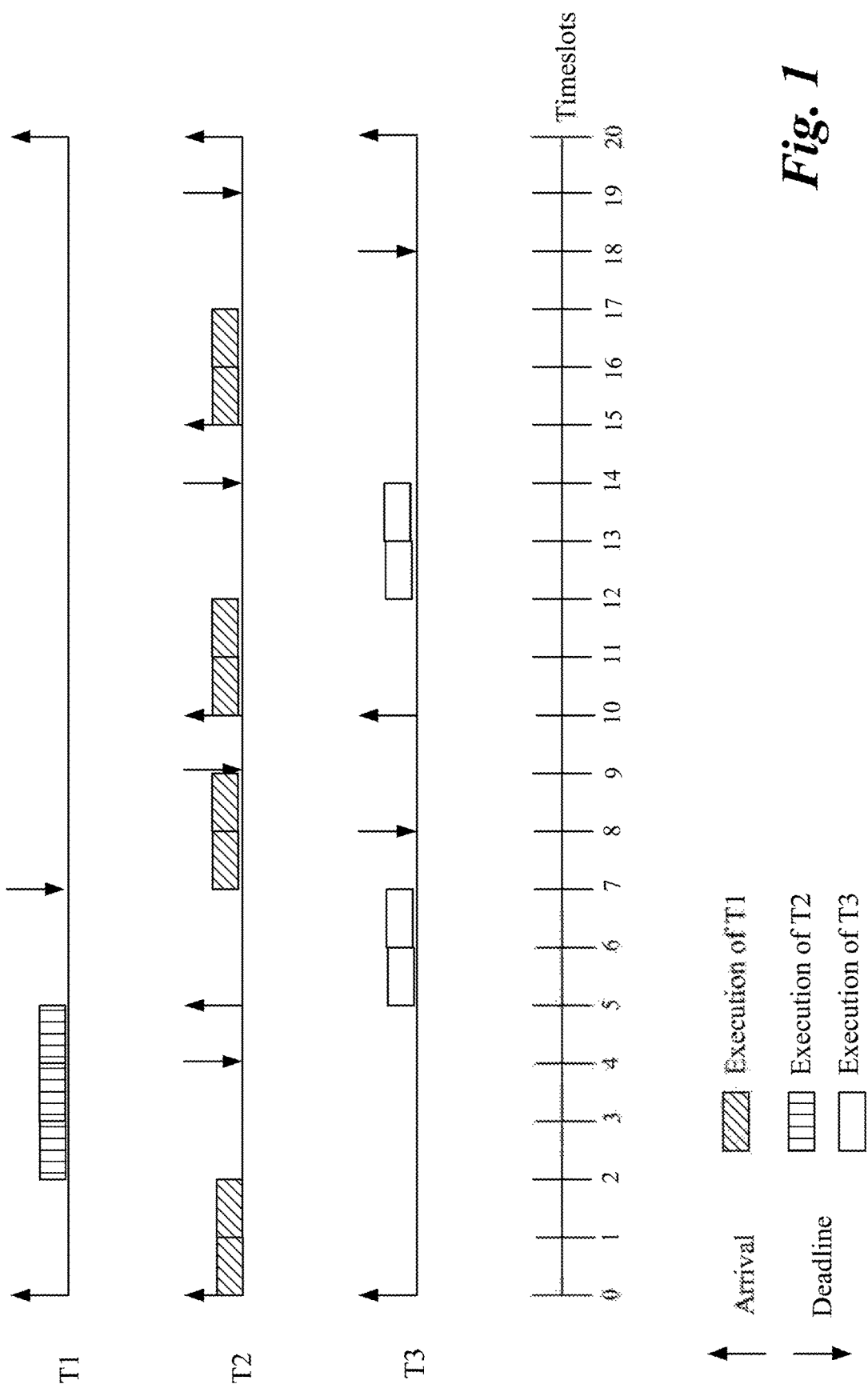
FIG. 1 illustrates by one embodiment, an implementation of an earliest deadline first implementation of a task set.

In the drawings, like reference numerals designate identical or corresponding parts throughout the several views. Further, as used herein, the words "a," "an" and the like generally carry a meaning of "one or more," unless stated otherwise.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one of more implementations. In one or more instances, well-known structures and components are shown in block diagram form in order to avoid obscuring the concepts of the subject technology.

An aspect of the present disclosure provides for method to determine feasibility of non-preemptive tasks on a uni-processor system. Specifically, the present disclosure applies to a special case of periodic tasks where the lowest priority task is always schedulable at all scheduling points of a corresponding set. Thus, the method of the present disclosure provisions for determining the feasibility of the overall system (i.e., a uni-processor system) in an efficient manner while reducing the computational cost of feasibility analysis to a single task check as opposed to analyzing all of the tasks within the system.

By one aspect of the present disclosure, an earliest deadline first (EDF) scheduling algorithm which is used for dynamic priority scheduling in real-time systems for both preemptive and non-preemptive cases is analyzed for a particular task set. From complexity point of view, EDF is polynomial for preemptive scheduling of tasks. However, it becomes pseudo-polynomial under non-preemptive case. Described herein, is a technique that determines EDF feasibility of non-preemptive task set by analyzing schedulability of the lowest priority task at common scheduling points generated by all higher priority tasks in the task set. This adjustment results in improving the computational cost of an existing test from $$O\left(n^2 \frac{p_n}{p_1}\right) \text{ to } O\left(\frac{P_n}{P_1}\right)$$

where n is the number of tasks in the system, while pn and p1 represent the task periods of largest and smallest periodic tasks respectively. With reduced computation cost, the feasibility of the present technique has the potential to he intergraded with online systems for testing feasibility of a special class of real-time systems under non-preemptive case.

In the design of hard real-time multitasking systems, the most fundamental issue is the timing correctness, i.e., these multitasking systems need to provide predictable behavior under all circumstances. In real-time systems, predictably is maintained by assigning priorities to individual tasks in the system based on some predefined criteria such as activation rate or deadline.

Scheduling algorithms can be adapted for scheduling real-time systems under fixed and dynamic scenarios. The most commonly used approach to schedule real-time tasks on a single processor is priority driven that can be further classified into fixed priority and dynamic priority. Fixed-priority scheduling algorithm assigns the same priority to all of the jobs/instances of a particular task. A task then generates an infinite number of instances after regular intervals called time period of the task. The priority assigned to the jobs of a task remains fixed throughout and should be different from the priorities assigned to jobs generated by all of the other tasks within the system.

In contrast, dynamic-priority scheduling algorithms place no restrictions on the manner in which priorities are assigned to individual jobs. Although fixed-priority scheduling algorithms are normally considered to be more predictable, they lose efficiency when higher system utilization is mandated. Dynamic-priority exhibits a few contexts switching as compared to fixed-priority counterpart and many real-time operating systems are able to execute tasks non-preemptively under both fixed and dynamic priority levels.

According to one embodiment of the present disclosure, real-time systems scheduling can be classified into two major categories; (i) preemptive algorithms that allow a running task to be interrupted at any time and can be replaced with another active task (ii) non-preemptive algorithms, where an already started task must be executed continuously until completion. As compared to preemptive scheduling algorithms, non-preemptive algorithms exhibit simplicity with less number of context switching and can hence have a potentially wider acceptance.

By one embodiment of the present disclosure, feasibility of schedule for a set of tasks is performed under the assumption that the set of tasks are non-preemptive and are to be executed on a single processor i.e., a uniprocessor system. Non-preemptive scheduling on a uniprocessor is important for a variety of reasons: (a) in many practical real-time scheduling problems such as I/O scheduling, properties of device hardware and software either make preemption impossible or prohibitively expensive; (b) non-preemptive scheduling algorithms are easier to implement than preemptive algorithms, and can exhibit dramatically lower overhead at run-time; (c) the overhead of preemptive algorithms is more difficult to characterize and predict than that of non-preemptive algorithms. Since scheduling overhead is often ignored in scheduling models, an implementation of a non-preemptive scheduler will be closer to the formal model than an implementation of a preemptive scheduler; (d) non-preemptive scheduling on a uni-processor naturally guarantees exclusive access to shared resources and data, thus eliminating both the need for synchronization and its associated overhead; and (e) the problem of scheduling all tasks without preemption forms the theoretical basis for more general tasking models that include shared resources.

Turning to FIG. 1, there is illustrated by one embodiment, an implementation of an earliest deadline first implementation of a task set. The EDF algorithm enqueues tasks in a priority queue. Whenever a task execution is completed, the queue searches for the task that is closest to its deadline. This task has the highest priority to be scheduled next for execution. If the queue search results in more than one task, then the EDF algorithm schedules one of the tasks arbitrarily. In other words, the EDF algorithm operates as follows: for each time slot, and for each ready process (i.e., a process that released or is available), the process which has the earliest (i.e., closest deadline in time) is executed.

For example, consider the following set of three tasks T1, T2, and T3, with their respective execution times (C) (i.e., processor time required to complete the task), a deadline (D) which refers to the time by which the task must be completed, and a period (P), which corresponds to the next occurrence of the task. For sake of simplicity each of the parameters C, D, and P are expressed in terms of time-slots.

|    | C | D | P  |
|----|---|---|----|
| T1 | 3 | 7 | 20 |
| T2 | 2 | 4 | 5  |
| T3 | 2 | 8 | 10 |

Note that the periods of the respective tasks are 20, 5, and 10 time-slots. Accordingly, FIG. 1 depicts an EDF scheduling for 20 time-slots (i.e., 20 is the least common multiple of the periods). In FIG. 1, the up-arrows correspond to the arrival of each instance of a task, and the down arrows correspond to the respective deadlines of the task. For every time slot (starting at zero) a processor schedules the task that has the earliest deadline. For instance, at time slot 0 starts the scheduling process by executing task 2, and executes the task for two time slots as each instance of task 2 requires two time-slots.

Further, the process at the end of time-slot 2, proceeds to execute task 1 (as it has the earliest, deadline as compared to task 3. In this manner, the EDF algorithm attempts to schedule at each time slot, and for each ready process the process which has the earliest (i.e., closest) deadline. When two tasks have the same absolute deadlines, EDF chooses one of the two at random and ties can be broken arbitrarily.

According to one embodiment of the present disclosure, a task model for schedulability analysis is performed tor a uni-processor system. Specifically, a periodic task model of hard real-time systems is considered wherein, a task is described by: (i) a task period pi that is the time between any two consecutive instances of $\tau_i$, (ii) a worst-case execution time $c_i$ that a task $\tau_i$ must get before its next occurrence, and (iii) a relative deadline $d_i$. The utilization of $\tau_i$ is given by $c_i/p_i$ and the cumulative system utilization is denoted by: $\Sigma_{i=1}^{n}(c_i/p_i)$.

Further, the model considered is an implicit deadline model of non-concrete periodic tasks. The term implicit deadline model refers to the scenario where task period is equal to the task deadline. The non-concrete task set is represented by $\tau=(\tau_1, \tau_2 \ldots \tau_n)$, where an instance of $\tau_i$ is generated at every integer multiple of $p_i$; the kth instance of $\tau_i$ occurs at time $t_k=t_{k-1}+p_i$. For the task system under consideration, no two tasks have the same period i.e. $p_i \neq p_j$, $\forall(i,j)$. As soon as $\tau_i$ is released, the task becomes ready for execution. Thus, it can be assumed that the first instances of all tasks are released at r=0, and that there are sufficient number of task priority levels that are available, and due to context switching the system overhead cost can be subsumed into the task execution time. In the system, a running task is executed till completion and cannot be interrupted.

By one embodiment, the model modifies the task system in such a way that no two tasks can have the same task period under non-preemptive case. For each $\tau_i$, the set of scheduling point sets (defined herein as the points in time at which the tasks can be scheduled) is generated by $S_i=\{lp_j;$ (j=I, . . . , i); (l=I, . . . $\lfloor p_i/p_j \rfloor$)}. Accordingly, a workload presented by a task $\tau_i$ at a point in time, t, along with all higher priority tasks $\{\tau_i, \tau_2 \ldots \tau_{i=1}\}$ by: $w_i(t)=\Sigma_{k=1}^{i} \lfloor 1/p_k \rfloor c_k$.

In what follows is provided a feasibility analysis tor EDF non-preemptive task set. By one embodiment, a periodic task set that is sorted in increasing order of the task period can only be scheduled feasibly under a non-preemptive EDF scheduling policy if, $$\sum_{i=0}^{n} \frac{c_i}{p_i} \leq 1 \quad (1)$$

$$\forall i, (1 < i \leq n), \forall t, (p_1 \leq t \leq p_i): c_i + \sum_{k=1}^{i-1} \left\lfloor \frac{t}{p_k} \right\rfloor c_k \leq t \quad (2)$$

By the above equations, the system must test t in the open interval of $(p_1<t<p_i)$ to determine feasibility of $\tau_i$. In what follows, there is provided according to another embodiment, an improved system wherein the results of equations (1) and (2) are extended in to confine the parameter t to set to a few scheduling points, and equations (1) an (2) are expressed as a sufficient condition.

By one embodiment of the present disclosure, a periodic task set that is sorted in increasing order of the task period can only be scheduled feasibly under a non-preemptive EDF scheduling policy, at a constant slowdown factor $\eta$, if $$\frac{1}{\eta}\sum_{i=0}^{n} \frac{c_i}{p_i} \leq 1, \quad (3)$$

$$\forall i, (1 < i \leq n), \forall t, (p_1 \leq t \leq p_i): \frac{1}{\eta}\left(c_i + \sum_{k=1}^{i-1} \left\lfloor \frac{t}{p_k} \right\rfloor c_k \right) \leq t, \quad (4)$$

where $t \in S_i = \{lp_j; \quad \forall j, (j=1, \ldots, i); \forall l, (l=1, \ldots \lfloor p_i/p_j \rfloor)\}$.

In the above equations, the parameter $S_i$ is called a set of scheduling points for $\tau_i$, assume $\eta$=1. The processor speed is able to vary over a discrete range, with $f_{min}$ and $f_{max}$ being the minimum and maximum operating frequency, respectively. However, one can eliminate the $\eta$, by setting $\eta$=1 for running the system at the maximum available speed and hence the computation demands are independent of the system speed. Equations (3) and (4) warrant that for any tasks $\tau_i$ only $S_i$ number of finite scheduling points are required to determine the feasibility of a task $\tau_i$ and the process continues unless all n task's feasibility is tested in decreasing priority order. The complexity of the above method is thus $O(n^2)$ i.e., a polynomial in terms of the number of tasks, in general, and hence $p_n/p_1$ dominates Eq. (4). The computational cost involved can be expressed as $O(n^2 p_n/p_1)$.

In what follows, we first highlight an associated drawback of equations (3) and (4) and further describe by one embodiment the necessary foundations to illustrate that every set $S_i$ has at least one value of t that is also available in set $S_{i+1}$ which is formed due to lower priority tasks. This relationship eventually leads us to the conclusion that there exists at least one scheduling point that is present in all the sets. The following observations are initially stated with respect to equations (3) and (4);

Observation 1: Because feasibility is tested for all the n tasks in the increasing order keyed by priority, the above method (equations (3) and (4)) have a computational cost of the order:

$$O\left(n^2 \frac{p_n}{p_1}\right).$$

The ratio $$\frac{p_n}{p_1}$$

becomes unreasonably large when $p_n \gg p_1$.

Observation 2: When $p_i > p_{i-1}$, there exists at least one scheduling point for $\tau_{i-1}$ that is common between $S_{i-1}$ and $S_i$, as priority $(\tau_{i-1})>$priority $(\tau_i) \Rightarrow p_i > p_{i-1}$.

With the aforementioned observations, by one embodiment of the present disclosure, is exploited the concept of common scheduling point in order to lower the computation cost for a special case of the task set where all task periods are different and $|S_{i-1}|<|S_i|$.

According to one embodiment of the present disclosure, for tasks $\tau_i$ and $\tau_{i+1}$, if the corresponding, set of scheduling points is represented by $S_i$ and $S_{i+1}$ respectively, then a point t that belongs to set $S_{i+1}$ i.e., $t \in S_{i+1}$, is not necessarily a member of $S_i$.

For any $\tau_i$ where $t \in S_i=\{l \cdot p_j, \forall j,(j=1, \ldots, i) \forall l,$ (l=1, . . . $\lfloor p_i/p_j \rfloor$)} and $\tau_{i+1}$ where $t \in S_{i+1}=\{i \cdot p_{j'}, \forall j',$ (j'=1, . . . , i,i+1)$\forall l$, (l=1, . . . $\lfloor p_{i+1}/p_{j'} \rfloor$)}. As tasks are ordered by increasing task periods $p_{i+1}>p_i$ and hence l has at least one additional value that results in element t for $S_{i+1}$ which does not exist in $S_i$. In other words, the number of elements in $S_{i+1}$ is larger than that in $S_i$, and hence the same $t \in S_{i+1}$ is not necessarily a member of $S_i$, i.e., $t \notin S_i$. Thus, $S_i \subset S_{i+1} \subset \ldots \subset S_n$.

It can be seen that for determining feasibility of a task $\tau_i$, all the points in scheduling points set Sn need to be tested, normally in ascending order. The set Si depends on the ratio of p1 and pi and the set Si can be viewed as a super set of sets constituted by higher priority tasks, i.e., S1, S2, . . . $S_i$. Consequently, the computational cost of determining feasibility of $\tau_i$ can be expressed with $$O\left(n\frac{p_i}{p_1}\right) \text{ to } O\left(n\frac{P_n}{P_1}\right)$$

in worst case for $\tau_n$ being the lowest priority task. Extending the same scenario to the overall systems consisting of n number of tasks, where all the task need to be tested for EDF feasibility and hence the worst case cost becomes of magnitude $O(n^2p_n/p_1)$.

Figure 2A:
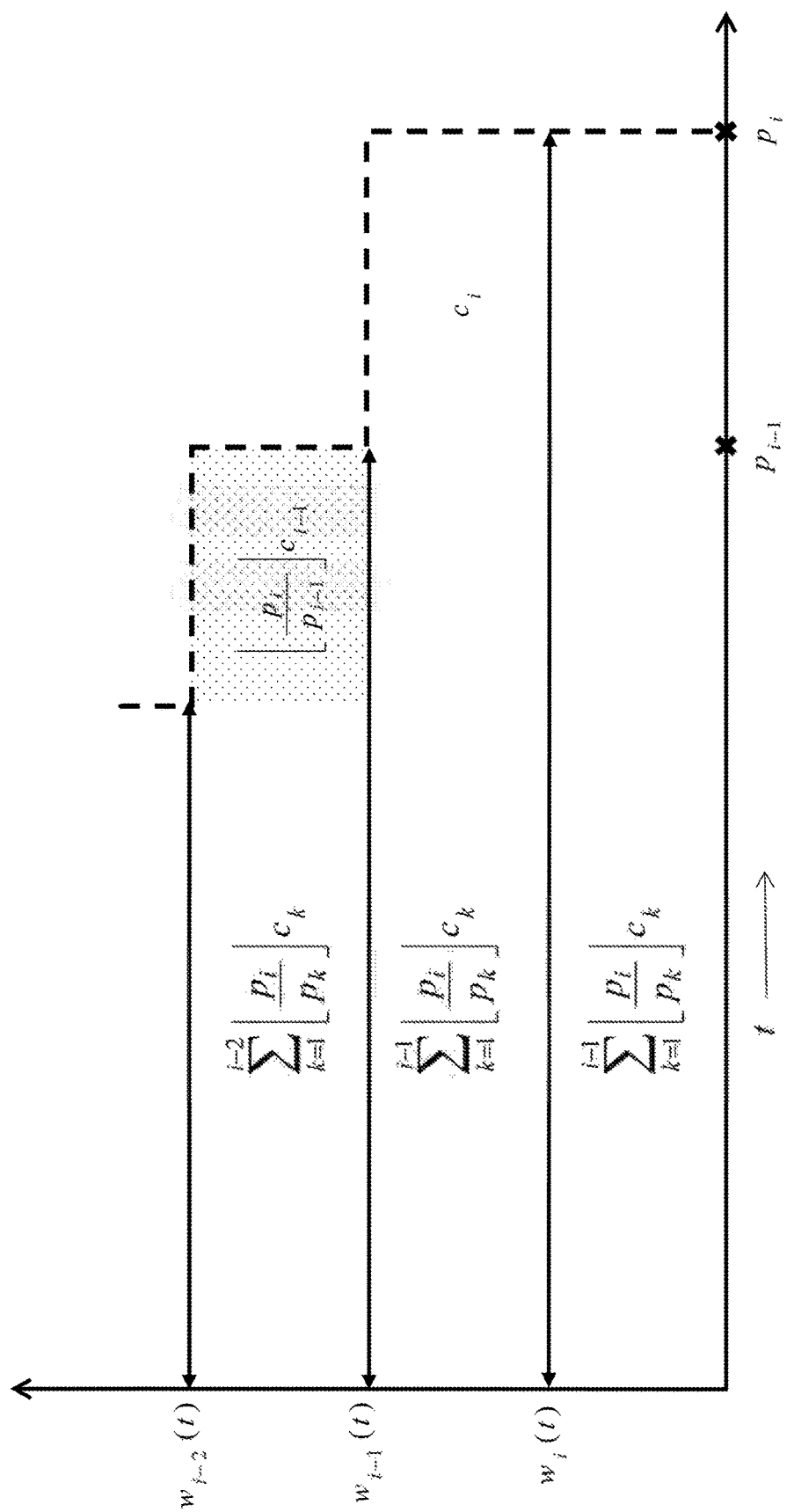
FIG. 2A depicts by one embodiment, an exemplary commutative workload by higher priority tasks at scheduling points.

FIG. 2A provides by one embodiment, a visual sketch of the aforementioned situation. It can be seen that the workload load w(t) at $p_i$ is the commutative load, because $\{\tau_1, \tau_2, \ldots \tau_{i-1}\}$ with a computation demand $\tau_i$ by is $c_i$. Since there exists maximum one instance of $\tau_i$, we express $c_i$ as a separate term. Remaining load can be expressed with $\Sigma_{k=1}^{i-1}\lfloor t/p_k \rfloor c_k$. The y-axis represents the computation demand and x-axis denotes the time in terms of integer multiple of task periods.

The workload decreases along y-axis and time increases along x-axis. Going up along y-axis from $w_i(t)$ to $w_{i-1}(t)$ at point "t" means eliminating the computation $c_i$. This reduction in workload for lower priority tasks has been reflected by the dotted line. For task $\tau_{i-2}$, the workload reduces by $c_i+\lfloor p_i/p_{i-1}\rfloor c_{i-1}$ and so on. It can be seen that at any point t in time, the workload is a non-increasing function of computation demands in the order of increasing priority order.

Moreover, $\tau_i$ and $\tau_{i+1}$, the corresponding set of scheduling points is represented by $S_i$ and $S_{i+1}$, is respectively, and the relationship $S_i \subset S_{i=1}$, holds for any task $\tau_i$ and, hence, this relationship among scheduling point sets enables to describe the following feature by one embodiment of the present disclosure.

By one aspect of the present disclosure, a periodic task set that is sorted in increasing order of the task period can only be scheduled feasibly under a non-preemptive EDF scheduling policy if the following two conditions are satisfied:

$$\sum_{i=0}^{n}\frac{c_i}{p_i} \le 1, \quad (5)$$

$$\forall t, (t \in S_n): c_n + \sum_{k=1}^{n-1}\left\lfloor\frac{t}{p_k}\right\rfloor c_k \le t. \quad (6)$$

The condition $\Sigma_{i=1}^{n}c_i/p_i \le 1$ indicates that the cumulative utilization of the system is at most one. In what follows is the proof for the validity of equation (6) at common scheduling points. Term $t \in F: F = \cap S_i \ne \emptyset$, $\forall i$, $(1 \le i \le n)$ reveals that there exists at least one scheduling point that is common in all the sets. Note that Sn is the super set. If x is the common scheduling point, then the schedulability of every $\tau_i$ must be tested at x. Let the total processor demand $L^i$ of $\tau_i$ at point x be:

$$L_{x \in S_i}^{i} = c_i + \sum_{k=1}^{i-1}\left\lfloor\frac{x}{p_k}\right\rfloor c_k. \quad (7)$$

$\tau_i$ is schedulable if $$L_{x \in S_i}^{i} \le x. \quad (8)$$

Note that the demand at point x will become higher for lower priority task $\tau_{i+1}$. This relationship can be depicted as:

$$L_{x \in S_{i+1}}^{i+1} = c_{i+1} + \sum_{k=1}^{i}\left\lfloor\frac{x}{p_k}\right\rfloor c_k. \quad (9)$$

$$= c_{i+1} + \left\lfloor\frac{x}{p_i}\right\rfloor c_i + \sum_{k=1}^{i-1}\left\lfloor\frac{x}{p_k}\right\rfloor c_k. \quad (10)$$

$\tau_{i+1}$ is schedulable if $$L_{s \in S_{i+1}}^{i+1} \le x. \quad (11)$$

Since tasks are ordered by increasing period, it can be observed that the R.H.S of Eq. (10) is larger than the R.H.S. of Eq. (7) and hence $L_{x \in S_{i+1}} > L_{x \in S_i}$ at x. This is due to the additional term ci+1. As a consequence, when Eq. (11) holds, Eq. (8) must also hold. Because when x∈F, $\tau_i$ is always schedulable at x whenever τi+1 is schedulable at x.

Eventually, Sn becomes the superset and the processor demand of τn at any point t∈ Sn is the maximum. If the demand of τn is satisfied at any t, then the remaining higher priority tasks must be schedulable at the same t. The reason that the same t always accommodates the lower priority task is that the processor demand of higher priority tasks at t decreases accordingly, i.e., $L_{(x)}^{n} \ge L_{(x)}^{n-1} \ge, \ldots, L_{(x)}^{1}$. If x is a feasible point for τn, then it must also be a feasible point for $\tau_{n-1}, \tau_{n-2}$, and so on (in the increasing order keyed by priority). Therefore, when $L_{s \in S_n}^{n} \le x$, $\forall x \in S_i$ holds, it becomes evident that all the higher priority tasks are also schedulable at x. Accordingly, all the i–1 higher priority tasks are schedulable if $L_x^i \le x$ and $F = S_j \ne \emptyset$, where j=1, . . . , i.

In what follows is provided an analysis of determining feasibility of a task set by one embodiment of the present disclosure. The analysis is performed from the perspective of computational cost. By an aspect of the present disclosure, the solution is applied to the task set given in Table 1. To determine feasibility of $\tau_i$, the schedulability of the system is tested at $|S_i|$ points using equations (3) and (4). To draw a conclusion, all tasks in the task set are analyzed at the respective scheduling tasks. Assume that the task set is schedulable by equations (5) and (6). In other words, it means all tasks up to τ5, being the lowest priority task, are evaluated.

TABLE 1

An example task set

| Task $\tau_i$ | Computational requirements | Task period | Element in set $S_i$ |
| --- | --- | --- | --- |
| 1 | c1 | 5 | 5 |
| 2 | c2 | 11 | 5, 10, 11 |
| 3 | c3 | 20 | 5, 10, 11, 15, 20 |
| 4 | c4 | 35 | 5, 10, 11, 15, 20, 22, 25, 30, 33, 35 |
| 5 | c5 | 50 | 5, 10, 11, 15, 20, 22, 25, 30, 33, 35, 40, 44, 45, 50 |

In such cases, out of 33 points, feasibility is tested at all points in sets $S_1$, $S_2$, $S_3$, $S_4$ and $S_5$. The number of tested points increases as tasks are ordered from the increasing task periods. The number of points to be tested grows unreasonably, especially when $p_i \gg p_j$, i.e., $\lfloor p_n/p_1 \rfloor$ points have to be tested for $\tau_i$. In contrast, equations (5) and (6) avoid testing feasibility of tasks starting from $\tau_1$ up to $\tau_n$ instead of schedulability of the lowest priority task at $|s_n|$ points which is tested and if this task meets its deadline, then the whole task set is declared schedulable.

Thus, by one embodiment, it can be seen that, in worst case $S_n$ points needed to be tested which are actually a collection of n scheduling points sets populated due to n−1 higher priority tasks and $p_n$ itself. Hence, the time complexity of the feasibility determination can be expressed as: as $$O\left(n \frac{p_n}{p_1}\right).$$

Moreover, the computational cost can be discussed in the best and worst cases: in the best case scenario, the workload presented by the system is low and hence its very likely scheduling problem will be addressed early. Under such scenarios, by the technique of determining feasibility of the task set as described above, one needs to check the feasibility of $\tau_n$ only at $\lfloor p_n/p_1 \rfloor$ points, Hence, the complexity of the proposed work cannot go beyond $p_n/p_1$, i.e., Eq. (4) is tested at all points in set $S_n$ that is actually $\lfloor p_n/p_1 \rfloor$ (i.e., a floor function of the ratio of a period of the nth task to the period of the first task).

By one aspect of the present disclosure, the computation for the worst case scenario is as follows: as the task periods can have arbitrary values and our test encounters the worst case when task periods are prime numbers. The scheduling points where feasibility of $\tau_n$ is tested becomes $|S_n| = \lfloor p_n/p_1 \rfloor + \lfloor p_n/p_2 \rfloor + \ldots \lfloor p_n/p_n \rfloor$. This situation results in a maximum number of points in the set; however, when all task periods are not prime numbers, the number of elements in set $S_n$ reduces accordingly. From the aforementioned observations, we can express the number of points in set as $\lfloor p_n/p_1 \rfloor \leq |S_n| \leq \Sigma_{i=1}^{n} \lfloor p_n/p_1 \rfloor$ and hence the computational cost of our test becomes $$O\left(\frac{p_n}{p_1}\right) O(np_n/p_1).$$

This result clearly shows that the technique of determining feasibility of scheduling a set of tasks as described herein dominates the existing solution from computational cost perspectives for a special case.

Accordingly, aspects of the present disclosure provide a novel low computational complexity feasibility testing technique for a set of periodically recurring tasks. The result is formulated based on the observation that in case of non-preemptive task scheduling, if the lowest priority task was feasible with the, then it can be concluded that the whole set of tasks was schedulable under the EDF scheduling algorithm. Note however, that the task periods are unique. Accordingly, the method exploits the relations among scheduling points sets and the workload presented by tasks and eventually it can be concluded that the maximum workload at a common scheduling points is due to the lowest priority task.

Figure 2B:
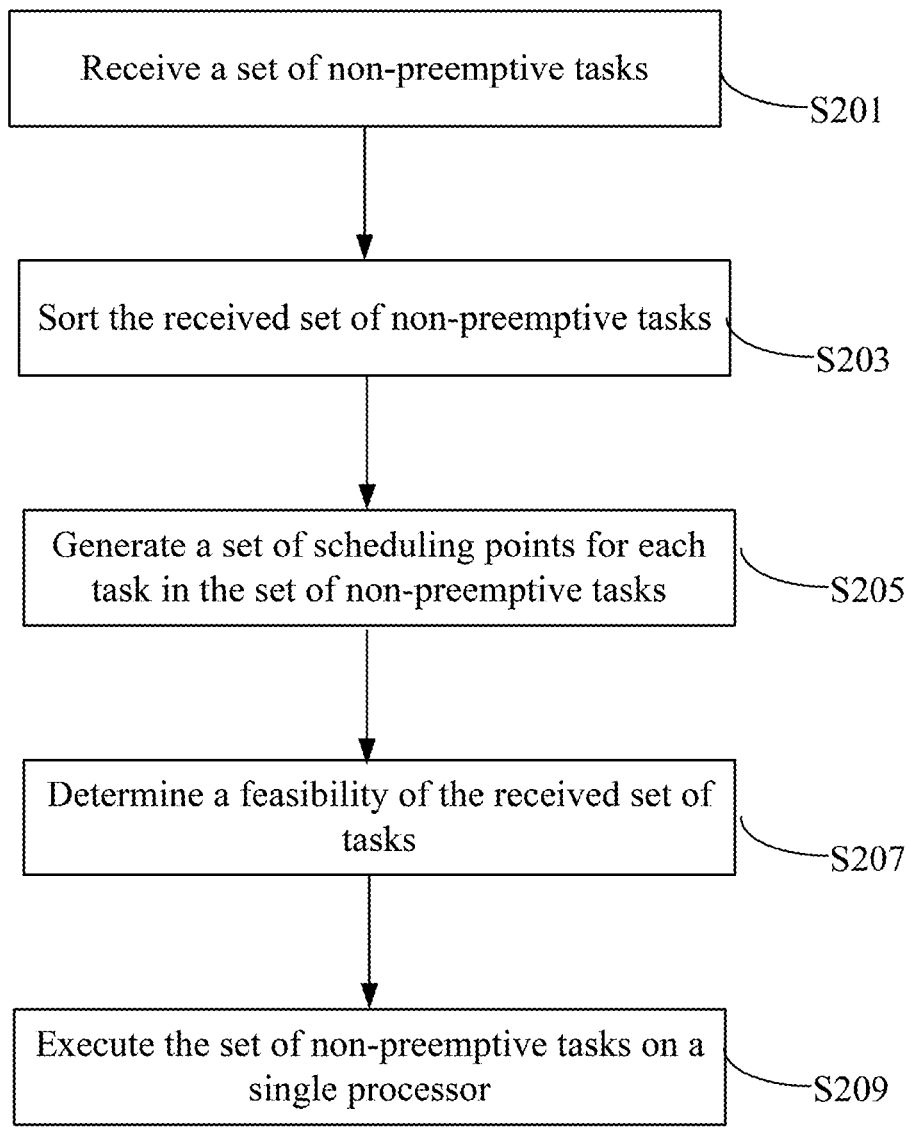
FIG. 2B illustrates according to an embodiment, an exemplary flowchart depicting the steps performed to determine a feasibility of a set of non-preemptive tasks that is to be executed on a single processor.

According to one embodiment of the present disclosure, there is described with reference to FIG. 2B a method for determining feasibility of a set of non-preemptive tasks that is to be executed on a single processor.

The process beings in step S201, wherein the set of non-preemptive tasks is received by the single processor. In the set of tasks, each task is characterized by a task period that corresponds to a time-interval between successive occurrence of the task. Further, each task is also characterized by a task deadline corresponding to a time by which the task is to be executed, and a task execution time. By one embodiment, each task of the set of non-preemptive tasks has a unique task period.

The process further proceeds to step S203, wherein the tasks belonging to the task set are sorted in an ascending manner. Specifically, by one embodiment of the present disclosure, the received set of non-preemptive tasks is sorted based on the task period of each task.

Further, in step S205, the method generates for each task of the set of non-preemptive tasks, a corresponding set of scheduling points. Each set of scheduling points corresponds to time instances at which the respective task can be executed, and wherein each set of scheduling points has a unique magnitude.

In step S207, the method determines a feasibility of the received task set. By one embodiment, the feasibility is determined by verifying whether the received task set satisfies a first condition and a second condition. The first condition corresponds to a utilization of the single processor being less than equal to one, and the second condition corresponds to verifying whether a lowest priority task is schedulable at its associated set of scheduling points.

The method further proceeds to step S209, wherein based on the set of non-preemptive tasks being determined as being feasible (step S207), the method executes (i.e., processes) the set of non-preemptive tasks on the single processor. Thereafter, the method as depicted in FIG. 2B terminates.

By one embodiment, each of the functions of the described embodiments may be implemented by one or more processing circuits. A processing circuit includes a programmed processor (for example, processor 503 in FIG. 3), as a processor includes circuitry. A processing circuit also includes devices such as an application-specific integrated circuit (ASIC) and circuit components that are arranged to perform the recited functions.

Figure 3:
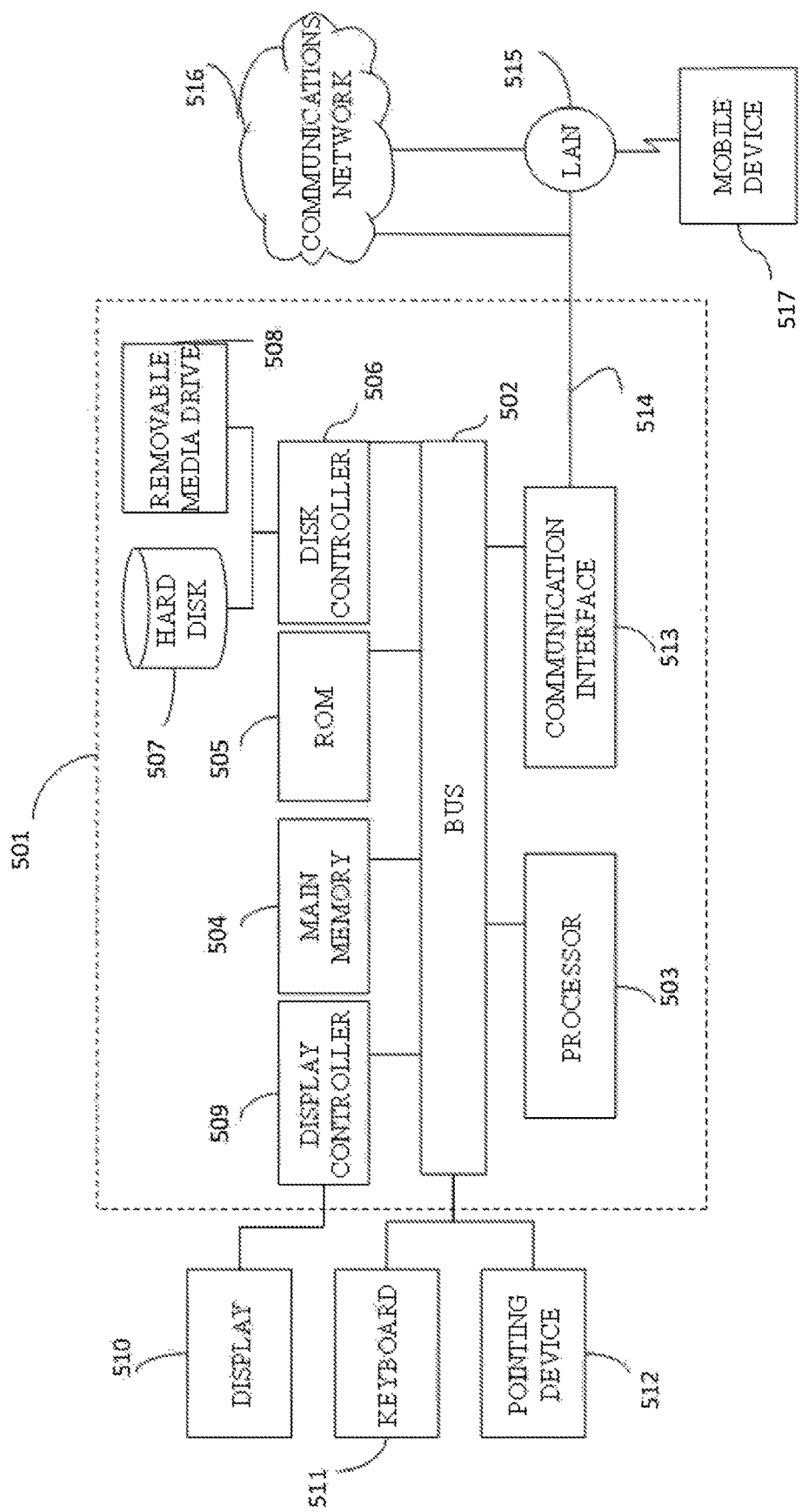
FIG. 3 is an exemplary block diagram of a composing device.

The various features discussed above may be implemented by a computer system (or programmable logic). FIG. 3 illustrates such a computer system 501. In one embodiment, the computer system 501 is a particular, special-purpose machine when the processor 503 is programmed to perform generation of drive signals to control a dimming interface of a plurality of LEDs, and other functions described above.

The computer system 501 includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 501 may also include a display controller 509 coupled to the bus 502 to control a display 510, for displaying information to a computer user. The computer system includes input devices, such as a keyboard 511 and a pointing device 512, for interacting with a computer user and providing information to the processor 503. The pointing device 512, for example, may be a mouse, a trackball, a finger for a touch screen sensor, or a pointing stick for communicating direction information and command selections to the processor 503 and for controlling cursor movement on the display 510.

The processor 503 executes one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 501, for driving a device or devices for implementing the features of the present disclosure, and for enabling the computer system 501 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present dislcosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 503 for execution. A computer readable medium may take many forms, including but not limited to, non-volatile media or volatile media. Non-volatile media includes, for example, optical, magnetic disks, and magneto-optical disks, such as the hard disk 507 or the removable media drive 508. Volatile media includes dynamic memory, such as the main memory 504. Transmission media, on the contrary, includes coaxial cables, copper wire and fiber optics, including the wires that make up the bus 502. Transmission media also may also take the form of acoustic or light waves, such as those generated during radio wave and infrared data communications.

Various forms of computer readable media may be involved in carrying out one or more sequences of one or more instructions to processor 503 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 501 may receive the data on the telephone line and place the data on the bus 502. The bus 502 carries the data to the main memory 504, from which the processor 503 retrieves and executes the instructions. The instructions received by the main memory 504 may optionally be stored on storage device 507 or 508 either before or after execution by processor 503.

The computer system 501 also includes a communication interface 513 coupled to the bus 502. The communication interface 513 provides a two-way data communication coupling to a network link 514 that is connected to, for example, a local area network (LAN) 515, or to another communications network 510 such as the internet. For example, the communication interface 513 may be a network interface card to attach to any packet switched LAN. As another example, the communication interface 513 may be an integrated services digital network (ISDN) card. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local network 515 (e.g., a LAN) or through equipment operated by a service provider, which provides communication services through a communications network 510. The local network 514 and the communications network 510 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 513, which carry the digital data to and from the computer system 501 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 510, the network link 514 and the communication interface 513. Moreover, the network link 514 may provide a connection through a LAN 515 to a mobile device 517 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

The invention claimed is:

1. A method for determining feasibility of a set of non-preemptive tasks that is to be executed on a single processor, the method comprising:
   receiving by circuitry, the set of non-preemptive tasks, each task being characterized by a task period that corresponds to a time-interval between successive occurrence of the task, a task deadline corresponding to a time by which the task is to be executed, and a task execution time, each task of the set of non-preemptive tasks having a unique task period;
   sorting by circuitry, in an ascending manner, the received set of non-preemptive tasks based on the task period of each task;
   generating, for each task of the set of non-preemptive tasks, a corresponding set of scheduling points, each set of scheduling points corresponding to time instances at which the respective task can be executed, and wherein each set of scheduling points has a unique magnitude;
   determining by circuitry, a feasibility of the received task set, by determining whether the received task set satisfies a first condition and a second condition, the first condition corresponding to a utilization of the single processor being less than equal to one, and the second condition corresponding to verifying whether a lowest priority task is schedulable at its associated set of scheduling points; and
   executing the set of non-preemptive tasks on the single processor based on the set of non-preemptive tasks being determined as being feasible.

2. The method of claim 1, wherein a time complexity of determining whether the set of non-preemptive tasks is feasible is based on a ratio of a first period of the first task in the sorted task set, and a last period of a last task in the sorted task set.

3. The method of claim 1, wherein each sorted task is assigned a unique priority that is based on the period of the task.

4. The method of claim 1, wherein the set of scheduling points corresponding to the respective tasks of the non-preemptive task set includes at least one scheduling point in common.

5. The method of claim 1, further comprising:
   computing by circuitry, at a given time instant, a workload associated with each task, the computed workload being based on the respective task and higher priority tasks.

6. The method of claim 5, wherein the workload for each task is computed as:

$$w_i(t) = \Sigma_{k=1}^{i} \lfloor t/p_k \rfloor c_k,$$

wherein t corresponds to the time instant at which the workload is computed, $p_k$ corresponds to period of the task and $c_k$ corresponds to a deadline of the task.

7. A device for determining feasibility of a set of non-preemptive tasks that is to be executed on a single processor, the device comprising:
   circuitry configured to
      receive the set of non-preemptive tasks, each task being characterized by a task period that corresponds to a time-interval between successive occurrence of the task, a task deadline corresponding to a time by which the task is to be executed, and a task execution time, each task of the set of non-preemptive tasks having a unique task period;
      sort in an ascending manner, the received set of non-preemptive tasks based on the task period of each task;
      generate, for each task of the set of non-preemptive tasks, a corresponding set of scheduling points, each set of scheduling points corresponding to time instances at which the respective task can be executed, and wherein each set of scheduling points has a unique magnitude;
      determine a feasibility of the received task set, by determining whether the received task set satisfies a first condition and a second condition, the first condition corresponding to a utilization of the single processor being less than equal to one, and the second condition corresponding to verifying whether a lowest priority task is schedulable at its associated set of scheduling points; and
      execute the set of non-preemptive tasks on the single processor based on the set of non-preemptive tasks being determined as being feasible.

8. The device of claim 7, wherein a time complexity of determining whether the set of non-preemptive tasks is feasible is based on a ratio of a first period of the first task in the sorted task set, and a last period of a last task in the sorted task set.

9. The device of claim 7, wherein each sorted task is assigned a unique priority that is based on the period of the task.

10. The device of claim 7, wherein the set of scheduling points corresponding to the respective tasks of the non-preemptive task set includes at least one scheduling point in common.

11. The device of claim 7, wherein the circuitry is further configured to compute at a given time instant, a workload associated with each task, the computed workload being based on the respective task and higher priority tasks.

12. The device of claim 7, wherein the workload for each task is computed as:

$$w_i(t) = \Sigma_{k=1}^{i} \lfloor t/p_k \rfloor c_k,$$

wherein t corresponds to the time instant at which the workload is computed, $p_k$ corresponds to period of the task and $c_k$ corresponds to a deadline of the task.

13. A non-transitory computer-readable medium including executable instructions, which when executed by circuitry, cause the circuitry to execute a method for determining feasibility of a set of non-preemptive tasks that is to be executed on a single processor, the method comprising:
   receiving the set of non-preemptive tasks, each task being characterized by a task period that corresponds to a time-interval between successive occurrence of the task, a task deadline corresponding to a time by which the task is to be executed, and a task execution time, each task of the set of non-preemptive tasks having a unique task period;
   sorting in an ascending manner, the received set of non-preemptive tasks based on the task period of each task;
   generating, for each task of the set of non-preemptive tasks, a corresponding set of scheduling points, each set of scheduling points corresponding to time instances at which the respective task can be executed, and wherein each set of scheduling points has a unique magnitude;
   determining a feasibility of the received task set, by determining whether the received task set satisfies a first condition and a second condition, the first condition corresponding to a utilization of the single processor being less than equal to one, and the second condition corresponding to verifying whether a lowest priority task is schedulable at its associated set of scheduling points; and executing the set of non-preemptive tasks on the single processor based on the set of non-preemptive tasks being determined as being feasible.

14. The non-transitory computer readable medium of claim 13, wherein a time complexity of determining whether the set of non-preemptive tasks is feasible is based on a ratio of a first period of the first task in the sorted task set, and a last period of a last task in the sorted task set.

15. The non-transitory computer readable medium of claim 13, wherein each sorted task is assigned a unique priority that is based on the period of the task.

16. The non-transitory computer readable medium of claim 13, wherein the set of scheduling points corresponding to the respective tasks of the non-preemptive task set includes at least one scheduling point in common.

17. The non-transitory computer readable medium of claim 13, further comprising:

computing by circuitry, at a given time instant, a workload associated with each task, the computed workload being based on the respective task and higher priority tasks.

18. The non-transitory computer readable medium of claim 17, wherein the workload for each task is computed as:

$$w_i(t) = \Sigma_{k=1}^{i} \lfloor t/p_k \rfloor c_k,$$

wherein t corresponds to the time instant at which the workload is computed, $p_k$ corresponds to period of the task and $c_k$ corresponds to a deadline of the task.

* * * * *